(12) United States Patent
Daiguji

(10) Patent No.: US 7,040,844 B1
(45) Date of Patent: May 9, 2006

(54) THROWAWAY INSERT AND THROWAWAY-TYPE ROTARY CUTTING TOOL

(75) Inventor: Hisashi Daiguji, Ibaraki (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 11/111,694

(22) Filed: Apr. 21, 2005

(30) Foreign Application Priority Data

Mar. 8, 2005 (JP) ............................. 2005-063937

(51) Int. Cl.
 *B23C 5/10* (2006.01)
(52) U.S. Cl. ............................. 407/113; 407/67; 407/35
(58) Field of Classification Search ................ 407/113, 407/114, 115, 116, 67, 100, 103, 35
See application file for complete search history.

(56) References Cited

U.S. PATENT DOCUMENTS

| | | | |
|---|---|---|---|
| 5,052,863 A | | 10/1991 | Satran |
| 5,078,550 A | * | 1/1992 | Satran et al. .................. 407/34 |
| 5,145,295 A | | 9/1992 | Satran |
| 5,199,827 A | | 4/1993 | Pantzar |
| 5,232,319 A | * | 8/1993 | Satran et al. ................ 407/114 |
| 5,486,073 A | * | 1/1996 | Satran et al. ................ 407/113 |
| 5,597,271 A | | 1/1997 | Men et al. |
| 5,634,745 A | | 6/1997 | Wiman et al. |
| 5,810,519 A | * | 9/1998 | Vogel et al. ................. 407/114 |
| 6,196,770 B1 | * | 3/2001 | Astrom et al. ................. 407/40 |
| 6,503,028 B1 | * | 1/2003 | Wallstrom .................... 407/35 |

FOREIGN PATENT DOCUMENTS

| | | |
|---|---|---|
| EP | 0 956 921 A3 | 5/2002 |
| EP | 0 956 921 B1 | 7/2004 |

OTHER PUBLICATIONS

Patent Abstracts of Japan for JP2003-334716 published Nov. 25, 2003.
Patent Abstracts of japan for JP02-298414 published Dec. 10, 1990.

* cited by examiner

*Primary Examiner*—Willmon Fridie, Jr.
(74) *Attorney, Agent, or Firm*—Darby & Darby

(57) ABSTRACT

A tool main cutting edge extends rearward in a rotating direction as it approaches a rear end at the outer periphery. The main cutting edge is a convexly curved line protruding toward the outside of a rake face viewed from the top and another convexly curved line extending toward the seat face, convexly curving from one end of the main cutting edge to the other, viewed from the side. When mounted, an inclination angle defined by the rake face gradually decreases from one end toward the other, and a projection line of a rotation about a rotation axis of the tool forms a convex arc smoothly coming, at a middle portion of the main cutting edge, into contact with a cylindrical surface about the axis and gradually retreats inward from the cylindrical surface as it approaches both ends of the main cutting edge.

7 Claims, 7 Drawing Sheets

THROWAWAY INSERT AND THROWAWAY-TYPE ROTARY CUTTING TOOL

INCORPORATION BY REFERENCE

The present application claims priority under 35 U.S.C. §119 to Japanese Patent Application No. 2005-063937 filed on Mar. 8, 2005. The content of the application is incorporated herein by reference in its entirety.

BACKGROUND OF THE INVENTION

1. Field of the Invention

The present invention relates to a throwaway insert (hereinafter, simply referred to as a insert) which is mounted to a tool body of a throwaway-type rotary cutting tool (hereinafter, simply referred to as a rotary cutting tool) to constitute cutting edges of the rotary cutting tool, and a rotary cutting tool having such a insert mounted thereto.

2. Description of the Related Art

As this type of insert and rotary cutting tool, for example, a cutting insert (insert) comprising at least one cutting edge (a main cutting edge) defined between a rake face and a relief face of the insert, and a rotary milling machine (a rotary cutting tool) having a cylindrical holder (a tool body) and such a cutting insert are proposed in Japanese Unexamined Patent Application Publication No. 2 -298414. In this cutting insert, the rake face and the relief face is continuously curved. As a result, a rake angle and a relief angle which are defined with respect to the cylindrical holder, that is, which are defined with the insert mounted to the tool body, are made invariable along the length of the cutting edge. Further, the inventor of the present invention proposes a insert and a rotary cutting tool having such a insert mounted thereto in Japanese Unexamined Patent Application Publication No. 2003-334716. In this insert, a main cutting edge is formed so as to be connected to one end of a cutting edge of a nose formed at a corner of a rake face. The main cutting edge has a tapered cutting edge connected to one end of the cutting edge of the nose, and a curved cutting edge connected to a joint point at one end of the tapered cutting edge opposite to the nose. The curved cutting edge is formed so as to be included on a predetermined cylindrical face with a rotation axis of a tool body as a center axis in a state in which the insert is mounted to the tool body such that the nose is positioned at the outer side of a distal end of the tool, and the tapered cutting edge is formed to extend inward from the cylindrical face as it approaches the nose from the curved cutting edge.

However, in the insert and rotary cutting tool disclosed in Japanese Unexamined Patent Application Publication No. 2-298414, the cutting edge is curved, and a curved side portion of a plane which intersects a cylinder constituting a cylindrical surface of the cutting edge is formed at an angle corresponding to an axial rake angle of the insert in a milling cutter. In other words, the main cutting edge is formed to be positioned on an intersecting ridgeline of the cylindrical surface of the rotary cutting tool about its rotating axis and a plane which intersects the cylindrical surface so as to form the constant axial rake angle. Thus, the main cutting edge has a shape of a straight line in side view as seen from the direction along the plane so as to form the constant axial rake angle with the insert mounted to the tool body. For this reason, the chips produced by the main cutting edge flows out onto the rake face while entirely abutting it, which makes it difficult to separate chips and cause an increase in cutting resistance. In particular, when a high ductile metal material such as aluminum is intended to be cut at high speed, a portion of the material positioned further outside than the cylindrical surface at a distal end of the main cutting edge (at the nose in Japanese Unexamined Patent Application Publication No. 2003-334716) is plucked off so as to be pulled out by chips which is hard to be separated. As a result, the rotation locus of the main cutting edge does not become a cylindrical surface about the rotation axis of the rotary cutting tool precisely, but the chips tend to be bitten toward the outer peripheral side beyond the cylindrical surface instead, but the verticalness of a vertically machined surface may be deteriorated instead.

However, according to the insert and rotary cutting tool disclosed in the Japanese Unexamined Patent Application Publication No. 2003-334716, the tapered cutting edge is formed to retreat inward from the cylindrical surface including the curved cutting edge as it approaches the nose. Thus, even when a material with such high ductility is cut at high speed, a portion of the material which is positioned at the outer peripheral side of the nose at the distal end of the insert is plucked off so as to be pulled out with the discharge of chips at other portions, thereby suppressing a tendency that the distal end of the insert bites into the workpiece toward the outer peripheral side. As a result, it is possible to cut a vertically machined surface with high surface quality. Further, Japanese Unexamined Patent Application Publication No. 2003-334716 discloses a construction in which the curved cutting edge is formed such that the distance of the curved cutting edge from the bottom face (mounting face) of the insert gradually decreases as it goes away from the nose while protruding forward in the rotating direction of the tool body. As a result, it is possible to satisfactorily separate chips even for the high ductile metal as described above and thereby to perform high-speed cutting.

Meanwhile, as disclosed in Japanese Unexamined Patent Application Publication Nos. 2-298414 and 2003-334716, in the insert in which the main cutting edge and the curved cutting edge of the main cutting edge is constructed to be included on the cylindrical surface with the rotation axis of the tool body of the rotary cutting tool as a center axis, if the projection line obtained by projecting the rotation locus of the curved cutting edge about the axis onto the plane including the axis is positioned to be inclined with respect to the cylindrical surface to include the curved cutting edge without precisely including the curved cutting edge on the cylindrical surface, for example, because the insert is not preciously mounted to the tool body, there is a problem in that the precision of a vertically machined surface may deteriorate. In particular, if the curved cutting edge is not positioned so as to be included on the cylindrical surface as such, for example, when the rotary cutting tool is moved toward the distal end in the rotating axis thereof step by step by the length of the cutting edge to perform cutting in forming a vertically machined surface which is deeper than the effective cutting edge length of the main cutting edge, it is possible to give high surface quality to individual vertically machined surfaces to be cut at each stage. However, step difference become conspicuous at a joint between adjacent vertically machined surfaces, which requires a finishing process after cutting. This causes the tool body, for example, to be bent during cutting. This is also true of a case in which the cylindrical surfaces to include the curved cutting edge during cutting at each stage coincides with each other.

Further, in the insert disclosed in Japanese Unexamined Patent Application Publication No. 2003-334716, the curved cutting edge and the tapered cutting edge is connected to each other so that respective tangential lines form a predetermined angle at a joint point between the curved and tapered cutting edges. As a result, chips formed by both the cutting edges are grown in different directions from the joint point as a boundary are easily separated from each other. Therefore, the chips formed by the curved cutting edge can further prevent the material positioned at the outer peripheral side of the nose from being pulled out. On the contrary, if the curved cutting edge is not positioned so as to be preciously included on the cylindrical surface, there is a problem in that the joint between the vertically machined surfaces when the rotary cutting tool is moved step by step in the axial direction to perform cutting tends to be conspicuous. Moreover, the curved cutting edge is formed such that the distance thereof from the bottom face (mounting face) of the insert gradually decreases as the curved cutting edge goes away from the nose while the curved cutting edge protrudes forward in the rotating direction of the tool body. As a result, Japanese Unexamined Patent Application Publication No. 2003-334716 discloses a construction in which chip separation is improved even for the above-described high ductile metal to perform high-speed cutting. However, in order to allow higher speed cutting, further improvement of the chip separation is expected.

SUMMARY OF THE INVENTION

The present invention has been made under the above situations. Accordingly, it is an object of the present invention to provide a insert and a rotary cutting tool which can make a joint (seam line) between individual vertically machined surfaces inconspicuous even when a rotary cutting tool is moved step by step to form a deep and vertically machined surface, which can obtain high precision and high surface quality over the entire vertically machined surface, and which can improve the chip separation to allow higher speed cutting.

In order to solve the problems and achieve the objects, the present invention provides a throwaway insert having a insert body which defines a substantially polygonal flat plate shape. The throwaway insert includes a rake face which is formed on an one polygonal surface of the insert body, a corner cutting edge which is formed at a corner of the rake face and has a substantial arcuate shape as seen from the top facing the one polygonal surface of the insert body, a main cutting edge which is formed at a side ridge of the rake face connected to one end of the corner cutting edge, and a relief face which is constituted by a side face of the insert body. The throwaway insert is mounted to a tool body which is to be rotated about an axis such that the rake face faces forward in a rotating direction of a tool. The corner cutting edge is positioned at an outer periphery of a distal end of the tool body, and the main cutting edge extends rearward in the rotating direction of the tool body as the main cutting edge approaches the rear end of the tool body at the outer periphery of the tool body. The rake face connected to the main cutting edge comprises an inclined face which is inclined inward toward the other polygonal surface of the insert body serving as a seat face to seat on the tool body, an inclination angle of the rake face with respect to the seat face gradually decreases from one end of the main cutting edge connected to the one end of the corner cutting edge toward the other end thereof, and a rake angle which is formed by the rake face with the insert mounted to the tool body gradually decreases and then gradually increases from one end of the main cutting edge toward the other end thereof.

The main cutting edge is formed in a shape of a convexly curved line which protrudes toward the outside of the rake face as seen from the top and a shape of another convexly curved line which extends toward the seat face while being convexly curved from the one end the main cutting edge to the other end thereof as seen from the side facing the relief face. With the insert mounted to the tool body, a projection line of a rotation locus of the main cutting edge about the axis forms a shape of a convex arc which smoothly comes, at a middle portion of the main cutting edge, into contact with a cylindrical surface having its center line corresponding to the axis and which gradually retreats inward from the cylindrical surface as it approaches both ends of the main cutting edge. Further, the present invention provides a rotary cutting tool in which such a insert is mounted to a tool body rotated about an axis such that the rake face faces forward in a rotating direction of the tool, the corner cutting edge is positioned at an outer periphery of a distal end of the tool body, and the main cutting edge extends rearward in the rotating direction of the tool body as the main cutting edge approaches the rear end at the outer periphery of the tool body.

As described above, in the insert and rotary cutting tool in which a main cutting edge is not included on a cylindrical surface about a rotation axis of a tool body of the rotary cutting tool, but a projection line (a projection line projected onto a plane including an axis) of a rotation locus of the main cutting edge about the axis is formed in a shape of a convexly curved line, as seen from the top, which smoothly comes, at a middle portion of the main cutting edge, into contact with a cylindrical surface and which retreats inward from the cylindrical surface as it approaches both ends of the main cutting edge, even if the insert is mounted to a tool body with the main cutting edge inclined from a predetermined position, the projection line itself to be transferred to a vertically machined surface to be cut does not vary as long as the inclination of the main cutting edge extends has a direction along a convex arc defined by the projection line. On the other hand, as described above, a joint between vertically machined surfaces when the rotary cutting tool is moved step by step to perform cutting, has a chevron-shaped section in which the arcuate projection line and another projection line obtained by shifting and transferring the convex arcuate projection line in the axial direction overlap each other. However, the radius of an arc defined by the projection line is set to be large, so that the height of the chevron can be suppressed so as not to be conspicuous, and the respective machined surfaces can be a vertically machined surface more approximate to a flat face. Moreover, even if the cylindrical surfaces do not coincide with each other due to bending of the tool body when the rotary cutting tool is moved step by step in that manner, the joint therebetween does not become large. As a result, it is possible to obtain a vertically machined surface with high precision and height quality without any conspicuous joint.

Further, the main cutting edge is formed in a shape of a convexly curved line which extends toward the seat face while being convexly curved as it approaches the other end of the main cutting edge from the one end of the main cutting edge as seen from the side facing the rake face. Accordingly, the rake face connected to the main cutting edge is also formed in a shape of a convexly curved line which is convexly curved similarly to the main cutting edge. In addition to the above, the main cutting edge is formed in a shape of a convexly curved line as also seen from the top such that the projection line of the main cutting edge forms a convexly arcuate shape. Thus, when a vertically machined surface is cut by the main cutting edge, a chip which is largely curved in a recessed shape and to which the projection line is transferred flows out onto the convexly curved rake face. Accordingly, it is possible to more easily separate chips from the rake face and dispose them rapidly. It is also possible to further promote high-speed cutting and thus to remarkably improve the cutting efficiency. Moreover, the main cutting edge which extends toward the seat face while being convexly curved as it approaches the other end of the main cutting edge from the one end of the main cutting edge in this manner is mounted to extend rearward in the rotating direction as it approaches the rear end of the tool body. Therefore, it is possible to increase the axial rake angle at the other end of the main cutting edge, i.e., at the rear end of the tool which is used at the time of deep cutting. Even when a wide chip is produced at the time of such deep cutting, it is possible to maintain an excellent chip separation property.

Moreover, in the insert of the present invention, the rake face connected to the main cutting edge can be formed to have an inclined face which is inclined inward from the rake face as it approaches the seat face, and the rake angle of the rake face which is formed with respect to the main cutting edge with such a insert mounted to the tool body of the rotary cutting tool is set to be a positive angle. In this case, the inclination angle of the rake face which has the inclined face and is formed with respect to the seat face of the insert body gradually decreases from the one end of the main cutting edge toward the other end thereof, and the rake angle defined by the rake face with the insert mounted to the tool body gradually decreases from the one end of the main cutting edge toward the other end thereof and then gradually increases. Thus, as described above, it is possible to prevent the main cutting edge which is inclined rearward in the rotating direction as it approaches the rear end of the tool body from being remarkably different at one end thereof at the distal end of the tool and at the other end thereof at the rear end of the tool. Also, the rake face can be convexly curved along the main cutting edge inside the rake face as described above such that a portion between both ends of the main cutting edge protrudes further than both ends of the main cutting edge. Thus, it is possible to further improve a chip separation property.

In addition, for example, when a bottom face is formed at the bottom of the vertically machined surface so as to be orthogonal thereto, the retreat amount by which both ends of the projection line of the main cutting edge retreat inward from the cylindrical surface is set such that the retreat amount of the one end of the main cutting edge is smaller than that at the other end of the main cutting edge which is positioned at the outer peripheral side of the rear end of the tool body. Thereby, the retreat amount by which the vertically machined surface at the bottom face retreats inward from the cylindrical surface also becomes small. Thus, it is possible to form the surroundings of a corner at which the vertically machined surface and the bottom face intersects each other into a shape closer to an orthogonal intersection, and it is possible to obtain a machined surface with higher quality. Further, if the inside of the rake face which has an inclined face is formed with a recessed surface which has a section of a concave arc and which is recessed from the inclined face toward the seat face over the entire periphery of the rake face with equal spacing from the main cutting edge, it is possible to more reliably and easily separate chips at a place where the chips which have flown on the rake face reaches the recessed surface. On the other hand, the relief face connected to the main cutting edge comprises a first relief face which is connected to the main cutting edge and is inclined to gradually retreat toward the seat face, and a second relief face which is connected to a portion of the first relief face at the seat face and is inclined to gradually retreat at a larger inclination angle than the first relief face, and the first and second relief faces are formed so as to extend toward the seat face while being convexly curved from the one end of the main cutting edge toward the other end thereof as seen from the side. As a result, when the rake face is formed to have an inclined face as described above, it is possible to secure an edge point angle of the main cutting edge by the first relief face whose relief angle becomes small and thereby to prevent the occurrence of loss, etc. It is also possible to sufficiently secure the retreat amount between the vertically machined surfaces which are formed by the main cutting edge by the second relief face having a larger relief angle than the first relief face. Moreover, the first and second relief faces are formed so as to be convexly curved as seen from the side similarly to the main cutting edge. Thus, it is possible to stabilize the widths of the first and second relief faces over the entire length of the main cutting edge and thereby to prevent a situation that lacks in the retreat amount. Further, such a insert is generally manufactured by inserting upper and lower punches having punching surfaces respectively conformed to the shape of a rake face and a seat face into a press metal die having an inner peripheral surface conformed to the shape of a relief face, by compressing a source powder for a insert such as cemented carbide within a cavity defined by an inner peripheral surface of the die and the punching surfaces, to form a green compact, and by sintering the green compact. In this case, if such first and second relief faces are formed on the relief face, the source powder is densely compressed by the inner peripheral surface of the die which forms the second relief face of the green compact and the outer peripheral portion of the punching surface of the upper punch which formed the rake face. As a result, it is possible to suppress sintering deformation of the main cutting edge when the green compact formed in that manner is sintered, and thereby to obtain a insert having, in particular, a high precision of the main cutting edge.

Also, when the relief face connected to the main cutting edge is formed with the first and second relief faces in that manner, at least the one end of the main cutting edge is formed with a planar third relief face which is connected to a portion of the second relief face at the seat face and extends perpendicularly to the seat face. Thereby, for example, as compared to a case in which a rake face is simply formed to gradually retreat from the first relief face toward the seat face as it approaches the seat face, it is possible to secure a larger thickness by virtue of side faces of the insert body at a portion of the second relief face immediately adjacent to the seat face. Accordingly, it is possible to secure particularly high cutting edge strength at one end of the main cutting edge which is positioned forward in the rotating direction of the with the insert mounted to the insert main body and which bites into a workpiece for the first time. It is also possible to prevent the one end of the main cutting edge and the corner cutting edge connected thereto from being lost due to an impact at the time of such biting. On the other hand, the rotary cutting tool having such a insert mounted thereon often performs a rubbing process in which a groove or recess having an inclined bottom face is formed in a workpiece by feeding the tool body toward the distal end obliquely with respect to the axis. When the rotary cutting tool is used for such a rubbing process, as for the above-mentioned insert, a side ridge of the rake face connected to the other end of the corner cutting edge, which is disposed at the distal end of the tool body, is formed with a sub-cutting edge extending from the other end of the corner cutting edge toward the inner periphery of the tool body with the insert mounted to the tool body, and a concave portion which is connected to the sub-cutting edge, reaches the other corner of the rake face opposite to the corner having the corner cutting edge formed therein, and is recessed to the inside of the rake face with respect to the extension line of the sub-cutting edge as seen from the top. Moreover, as for such a insert, as seen from the top, an angle of a tangential line touching both ends of the concave portion formed with respect to the extension line of the corner cutting edge is larger in a range of 5° to 20° than an angle at which a side ridge of the other polygonal surface located on the opposite side to the side ridge having the sub-cutting edge and the concave portion formed therein is formed with respect to the extension line.

DESCRIPTION OF THE PREFERRED EMBODIMENTS

Figure 1:
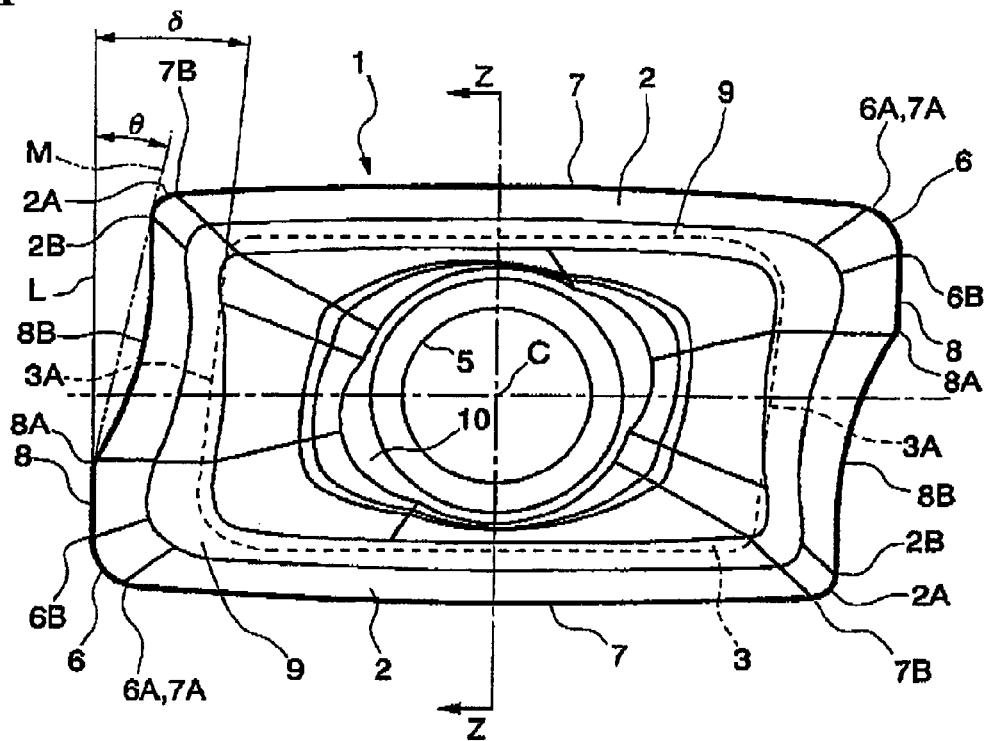
FIG. 1 is a plan view illustrating a insert according to an embodiment of the present invention.

FIGS. 1 to 4 illustrate an embodiment of a insert of the present invention. FIGS. 5 to 9 illustrate an embodiment of a rotary cutting tool having the insert of the embodiment in FIGS. 1 to 4 mounted thereto. The insert of the present embodiment is a positive insert which comprises a insert body 1 which is made of a hard material such as cemented carbide, and is formed in a substantially quadrilateral shape, more specifically, in an oblong and substantially parallelogrammic flat plate shape, a rake face 2 which is formed at the outer peripheral side of the one parallelogrammic surface of the insert, a seat face 3 which is formed at the other parallelogrammic surface of the insert for allowing the rotary cutting tool to be seated on a tool body, which will be described later, and relief faces 4 which are formed at four sides. Cutting edges are formed at interesting ridgelines of the rake face 2 and the relief faces 4, and a relief angle with respect to the cutting edges is given the relief faces 4. Further, a mounting hole 5 having a circular section is formed at the center of both the parallelogrammic surfaces so as to pass through the insert body 1 in the direction of its thickness. The seat face 3 has a flush flat face which extends in a direction perpendicular to a center line C of the mounting hole 5, and the insert body 1 itself has a rotationally symmetrical shape of 180° about the center line C. Among corners at the outer periphery of the rake face 2, corners which are positioned at acute ends of the one parallelogrammic surface are formed with corner cutting edges 6, serving as the cutting edges, which is formed in a substantially convex 1/4 arc shape as shown in FIG. 1, as seen from the top facing the one parallelogrammic surface in the direction of the center line C. Moreover, a side ridge of the rake face 2 connected to one end 6A of each of the corner cutting edges 6 is formed with a main cutting edge 7, serving as the cutting edge, which extends along each of long sides of the one parallelogrammic surface, and the side ridge of the rake face 2 connected to the other end 6B of the corner cutting edge 6 is formed with a sub-cutting edge 8, also serving as the cutting edge, which extends along each of short sides of the one parallelogrammic surface. The main cutting edge 7 and the sub-cutting edge 8 are smoothly connected to the corner cutting edge 6 at its both ends 6A and 6B, respectively. In addition, the corner cutting edge 6, the main cutting edge 7 and the sub-cutting edge 8 are respectively formed with extremely narrow lands which are perpendicular to the center line C in a section orthogonal to the respective cutting edges. Further, a corner 2A which is positioned at each of obtuse ends of the one parallelogrammic surface having the rake face 2 formed therein are also formed in a substantially convex 1/4 arc shape as seen from the top. Here, the radius of the corner is smaller than the radius of the convex arc defined by the corner cutting edge 6.

Here, the sub-cutting edge 8 is formed in a shape of a straight line which is perpendicular to a longitudinal direction (in the right-and-left direction in FIG. 1) of the insert body 1 as seen from the top, and extends on one plane perpendicular to the center line C together with the corner cutting edge 6. Further, a portion which is opposite to the sub-cutting edge 8 at the side ridge of the rake face 2 having the sub-cutting edge 8 formed therein and which extends to the obtuse end corner 2A from the other end 8A of the sub-cutting edge 8 defines a concave portion 8B recessed so as to be concavely curved to the inside of the insert body 1 as it approaches the corner 2A as seen from the top, and then extends perpendicularly to the longitudinal direction of the insert body 1 and reaches the corner 2A.

Accordingly, the concave portion 8B is formed so as to be recessed to the inside of the rake face 2 with respect to an extension line L of the sub-cutting edge 8 as seen from the top. Also, in the present embodiment, as for a tangential line M which touches both ends of the concave portion 8B as seen from the top, that is, a tangential line M which touches the other end 8A of the sub-cutting edge 8 and the end 2B of the corner 2A at the concave portion 8B, an angle θ of the tangential line M formed with respect to the extension line L is set to be larger in a range of 5° to 20° than an angle δ at which a side ridge 3A located on the opposite side in the thickness direction to the side ridge of the rake face 2 having the sub-cutting edge 8 and the concave portion 8B formed therein among side ridges of the other parallelogrammic surface of the insert body 1 which becomes the seat face 3 indicated by a broken line in FIG. 1 is formed with respect to the extension line L as seen from the top.

In addition, in the present embodiment, the concave portion 8B intersects the sub-cutting edge 8 so as to be bent with an obtuse angle at the other end 8A of the sub-cutting edge 8 in plan view (the opposite end to the other end 6B of the corner cutting edge 6), and is recessed to the inside of the rake face 2 while forming a substantially concave arc from the other end 8A toward the corner 2A. Here, the radius of the concave arc is sufficiently larger than the radius of the convex arc defined by the corner cutting edge 6 or corner 2A, and is sufficiently smaller than the radius of curvature of a convexly curved line defined by the main cutting edge 7, as seen from the top, which will be described later. Further, the concave arc of the concave portion 8B at the sub-cutting edge 8 smoothly touches a straight line extending perpendicularly to the longitudinal direction of the insert body 1, as described above, from the end 2B at the corner 2A. Accordingly, the concave portion 8B is also concavely curved to the inside of the rake face 2 with respect to the tangential line M as shown in FIG. 1.

Further, in the other parallelogrammic surface of the insert body 1 which becomes the seat face 3, as indicated by the broken line in FIG. 1, the four side ridges including the side ridge 3A are formed in a shape of a straight line, and each corner is formed in a shape of a convex arc smoothly connected to the side ridges. Here, the radius of each acute end corner of the seat face 3 which is located at the backside (opposite side in the thickness direction of the insert body 1) of the corners having the corner cutting edges 6 at the rake face 2 formed therein is larger than the radius of each obtuse end corner of the seat face 3 which is located at the backside of each obtuse end corner 2A of the rake face 2. Incidentally, in the present embodiment, the angle δ at which the side ridge 3A of the other parallelogrammic surface defined by the seat face 3 is formed with respect to the extension line L as seen from the top is set to 5°, while the angle δ at which the tangential line L is formed with respect to the extension line L as seen from the top is set to 12°. Accordingly, the difference between the angles δ and θ is 7°.

Moreover, as described above, the concave portion 8B formed between the other end 8A of the sub-cutting edge 8 and the obtuse end corner 2A of the rake face 2 at the side ridge of the rake face 2, as seen from the side facing the relief face 4 connected to the sub-cutting edge 8, retreats toward the seat face 3 while drawing a convexly curved line from the one plane on which the corner cutting edge 6 and the sub-cutting edge 8 extend as it approaches the obtuse end corner 2A, and then extends on the other plane perpendicular to the center line C and positioned nearer to the seat face 3 than the one plane together with the obtuse end corner. Further, the obtuse end corner also is formed in a substantially 1/4 arc shape as seen from the top.

Figure 2:
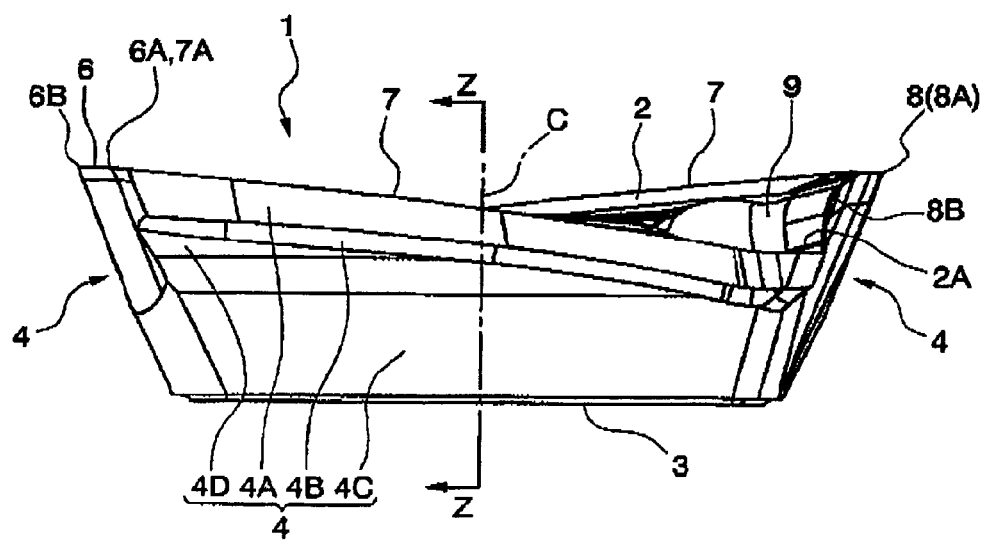
FIG. 2 is a side view of the insert shown in FIG. 1.

On the other hand, as seen from the top, the main cutting edge 7 is formed in a shape of a smoothly convexly curved surface which is projected to the outside of the rake face 2, i.e., to the outside of the insert body 1. As seen from the side facing the relief face 4 connected to the main cutting edge 7, the main cutting edge 7 is also formed in a shape of a convexly curved line which extends toward the seat face 3 while being smoothly convexly curved as it approaches the other end 7B which is positioned at the obtuse end corner from the one end 7A of the main cutting edge 7 connected to the one end 6A of the corner cutting edge 6, as shown in FIG. 2. In addition, the radius of curvature of a convexly curved line which is defined at a certain point of the main cutting edge 7 by the main cutting edge 7 as seen from the top is larger than the radius of curvature of a convexly curved line which is defined at this point by the main cutting edge 7 as seen from the side. That is, a convexly curved line at any portion of the main cutting edge 7 as seen from the top is made smoother than a convexly curved line thereof as seen from the side, and these radii of curvature are sufficiently larger than the radius of a convex arc which is defined by the corner cutting edge 6, as seen from the top, or the radius of the concave portion 8B.

Figure 3:
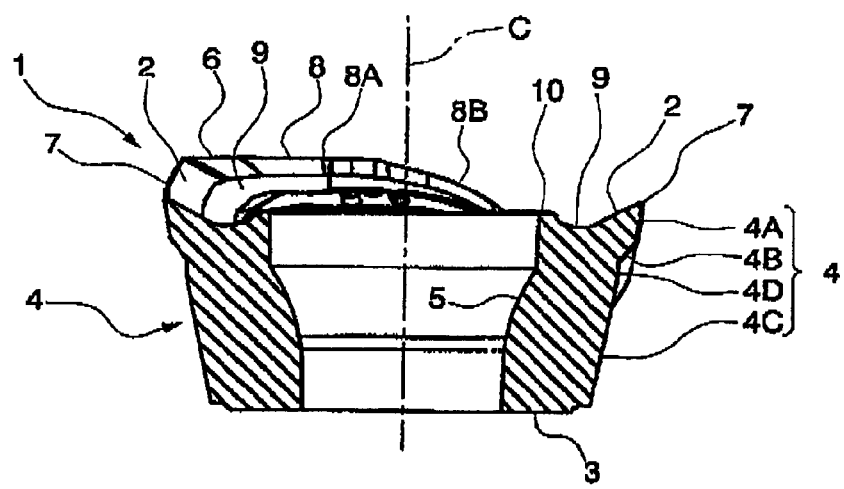
FIG. 3 is a cross-sectional view taken along the line Z—Z in FIGS. 1 and 2.
Figure 4:
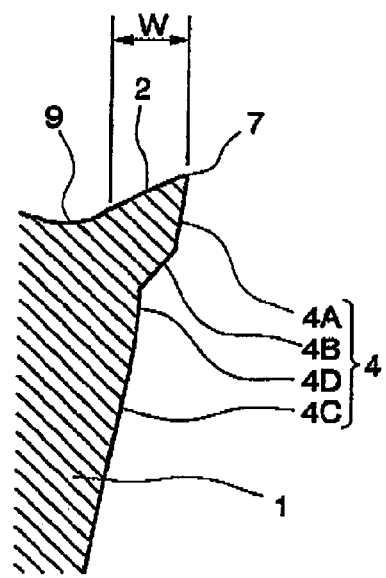
FIG. 4 is an enlarged view illustrating surrounding parts of a main cutting edge 7 shown in FIG. 3.

Moreover, the rake face 2 connected to the corner cutting edge 6, the main cutting edge 7 and the sub-cutting edge 8 are formed to have an inclined surface which is inclined to the seat face 3, as shown in FIGS. 3 and 4, as it approaches the inside of the rake face 2 as seen from the top. The inclination angle of the rake face 2 with respect to the seat face 3 in a direction getting closer to the inside of the rake face 2 is approximately uniform. Accordingly, in a section which intersects the cutting edges (corner cutting edge 6, main cutting edge 7 and sub-cutting edge 8) along the direction getting closer to the inside of the rake face, the rake face 2 is formed in a shape of a substantially straight line which is inclined to the seat face 3. However, it is noted herein that the rake face 2 connected to the main cutting edge 7 is configured such that the inclination angle of the rake face with respect to the seat face 3 gradually decreases from the one end 7A of the main cutting edge 7 toward the other end 7B thereof and such that the reduction ratio of the inclination angle gradually decreases from the one end 7A of the main cutting edge 7 toward the other end 7B thereof, and then gradually increases from a middle portion of the main cutting edge. In addition, among the surfaces of the insert body 1, at least the rake face 2, preferably, the one entire parallelogrammic surface is subjected to lapping.

Further, a recessed face 9 having a concave arc section is formed further inside the rake face 2 which is formed to have an inclined face in that manner. The recessed face 9 intersects a straight line defined by the inclined face as shown in FIG. 4 at an obtuse angle from the inclined face which has a section of a substantially straight line as described above, and is recessed toward the seat face 3 with respect to the inclined face. The recessed face 9 as seen from the top has a shape dimension which is approximately one round smaller than the peripheral shape, as seen from the top, of the one parallelogrammic surface of the insert body 1 having the rake face 2 formed thereon, and is formed over the entire periphery inside the rake face 2. The recessed face 9 is also continuously formed while it rises and falls in the direction of the center line C in conformity with the unevenness of the cutting edges in the direction of the center line C and the rising and falling of the rake face 2 such that the depth from an intersection with the rake face 2 in the above section is almost uniform.

A portion of such a recessed face 9 which extends along the main cutting edge 7 is formed so as to extend with almost the same spacing from the main cutting edge 7. Accordingly, the width W (width along the plane perpendicular to the center line C) of the rake face 2 which is positioned between the recessed face 9 and the main cutting edge 7 and is connected to main cutting edge 7 becomes almost uniform except for the vicinity of both ends 7A and 7B. Further, the width of a portion of the recessed face 9 which extends along the main cutting edge 7 is also almost uniform. In addition, the rake face 2 connected to the main cutting edge 7 with the uniform width has preferably a narrow width of about 0.5 mm to 0.8 mm, and has a width of 0.6 mm in the present embodiment. To the contrary, the width of the rake face 2 and the recessed face 9 inside the corner cutting edge 6 and the sub-cutting edge 8 continued therewith is larger than the inner portion of the main cutting edge 7. Moreover, the inside of the recessed face 9 has a planar boss surface 10 which is positioned between both ends 7A and 7B of the main cutting edge 7 after it protrudes in the direction of the center line C, and which is perpendicular to the center line C. An opening of the mounting hole 5 on the one parallelogrammic surface is formed in the boss surface 10.

On the other hand, the sides of the insert body 1 having the relief faces 4 formed therein are formed so as not to be inclined or be protruded to the outside of the insert body 1 from the cutting edges 6 to 8, the concave portion 8A and the obtuse end corner 2A to the seat face 3 over the entire periphery of the insert body 1. In particular, the insert of the present embodiment becomes a positive insert in which the portion connected to the rake face 2 gradually retreats to the inside of the insert body 1 as it approaches the seat face 3. The portions of the sides connected to the side ridge in which the corner cutting edge 6, the sub-cutting edge 8, the concave portion 8B and the obtuse end corner 2A are formed are formed to be convexly and concavely curved in conformity with the shape of the side ridge which is convexly and concavely curved in the peripheral direction of the insert body 1 as described above as seen from the top. Moreover, the relief face 4 of the sides connected to the corner cutting edge 6 and the sub-cutting edge 8 is formed in a shape of a bent surface which has a smaller relief angle at the corner cutting edge 6 and the sub-cutting edge 8 and has a larger relief angle at the seat face 8. Also, in the present embodiment, as described above, the angle θ formed between the concave portion 8B and the tangential line L is larger than the angle δ formed between the side ridge 3A of the seat face 3 on the opposite side to the rake face and the tangential line L. As a result, the relief angle of the side portion connected to the concave portion 8B gradually increases from the obtuse end corner 2A toward the other end 8A of the sub-cutting edge 8. Accordingly, the relief angle of the side portion from the corner cutting edge 6 to the obtuse end corner 2A becomes maximum at the portion of the relief face 4 connected to the corner cutting edge 6 and the sub-cutting edge 8.

On the contrary, from the one end 7A to the other end 7B, a portion of the relief face 4, on the main cutting edge 7 side, connected to the main cutting edge 7 is formed with a first relief face 4A which is connected to the main cutting edge 7 and which is inclined so as to be gradually retreated as it approaches the seat face 3, and a second relief face 4B which is connected to a portion of the first relief face 4A at the seat face 3 and which is inclined so as to gradually retreated at an inclination angle larger than the first relief face 4A. The portion of the relief face 4, on the main cutting edge 7 side, connected to the main cutting edge 7 is formed with a stepped portion which protrudes toward the outer peripheral side with respect to the seat face 3, as shown in FIG. 3 and FIG. 4, by these first and second relief faces 4A and 4B. It is noted herein that the first and second relief faces 4A and 4B in the direction along the main cutting edge 7 are formed in a shape of a convexly curved surface which smoothly protrudes toward the outside of the insert body 1 in conformity with the smoothly convexly curved line defined by the main cutting edge 7 as seen from the top such that each inclination angle gradually increases as the first and second relief faces approaches the other end 7B thereof from the one end 7A of the main cutting edge 7, that is, such that the portions of the first and second relief faces on the other end 7B side retreat toward the inside of the insert body 1 at an angle larger than those on the one end 7A side as they approaches the seat face 3.

Further, the first and second relief faces 4A and 4B gradually retreat toward the inside of the insert body 1 at a uniform angle, respectively, as they get closer to the seat face 3 from the main cutting edge 7. Accordingly, the first and second relief faces is formed in a shape of a straight line as shown in FIG. 3 and FIG. 4 in a section orthogonal to the main cutting edge 7. Moreover, the width of the first and second relief faces 4A and 4B (the width thereof in the direction of the center line C) are almost uniform from the one end 7A of the main cutting edge 7 to the other end 7B. Accordingly, the first and second relief faces 4A and 4B extend so as to gradually extends toward the seat face 3 while being convexly curved as they approaches the other end 7B of the main cutting edge from the first end 7A of the main cutting edge, as shown in FIG. 2 in plan view as seen from the side, similarly to the main cutting edge 7.

Moreover, the portion of the relief face 4, at the seat face 3 side, connected to the main cutting edge 7 is formed in a shape of an inclined flat face which gradually retreats at a smaller uniform inclination angle (an inclination angle almost equal to that of the first relief face 4A) than the second relief face 4B as it approaches the seat face 3, that is, a flat face which extends straight in a direction along the main cutting edge 7, thereby serving as a constraint face 4C when a insert is mounted to the tool body which will be described later. It is noted herein that an edge of the constraint face 4C on the main cutting edge 7 side extends perpendicularly to the center line C from the one end 7A of the main cutting edge 7 toward the other end 7B of the main cutting edge 7 (extends parallel to the seat face 3) as shown in FIG. 2 as seen from the side, and intersect an edge of the second relief face 4B at the seat face 3 which gradually get closer to the seat face 3 while being convexly curved as it approaches the other end 7B from the one end 7A as seen from the side as described above, in the middle of getting closer to the other end 7B.

Accordingly, a gap whose width gradually increases in the direction of the center line C as it approaches the one end 7A as seen from the side, is formed between the edge of the second relief face 4B at the seat face 3 and the edge of the constraint face 4C on the main cutting edge 7 side at the one end 7A of the main cutting edge 7 rather than an intersection of those edges so as to be connected to the portion of the second relief face 4B at the seat face 3. Also, the gap is formed in a shape of a flat face perpendicular to the seat face, thereby serving as a third relief face 4D in the present embodiment. The constraint face 4C intersects the third relief face 4D at the edge thereof on the main cutting edge 7 at an obtuse angle. Since the above edge extends perpendicularly to the center line C as described above in the present embodiment, the constraint face 4C and the third relief face 4D extends parallel to each other from the one end 7A of the main cutting edge 7 toward the other end 7B of the main cutting edge 7.

Figure 5:
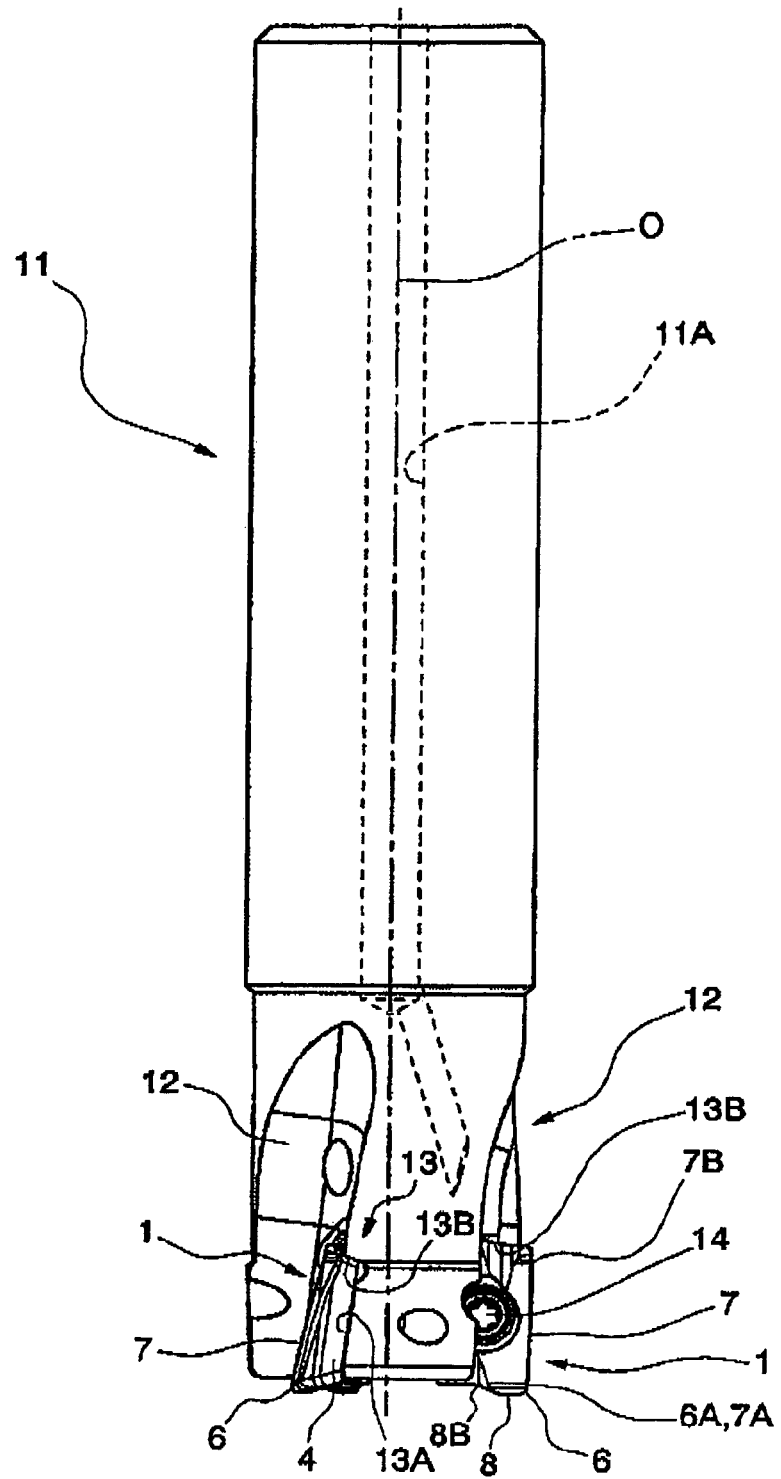
FIG. 5 is a plan view illustrating a rotary cutting tool having the insert shown in FIG. 1 mounted thereto, according to an embodiment of the present invention.
Figure 6:
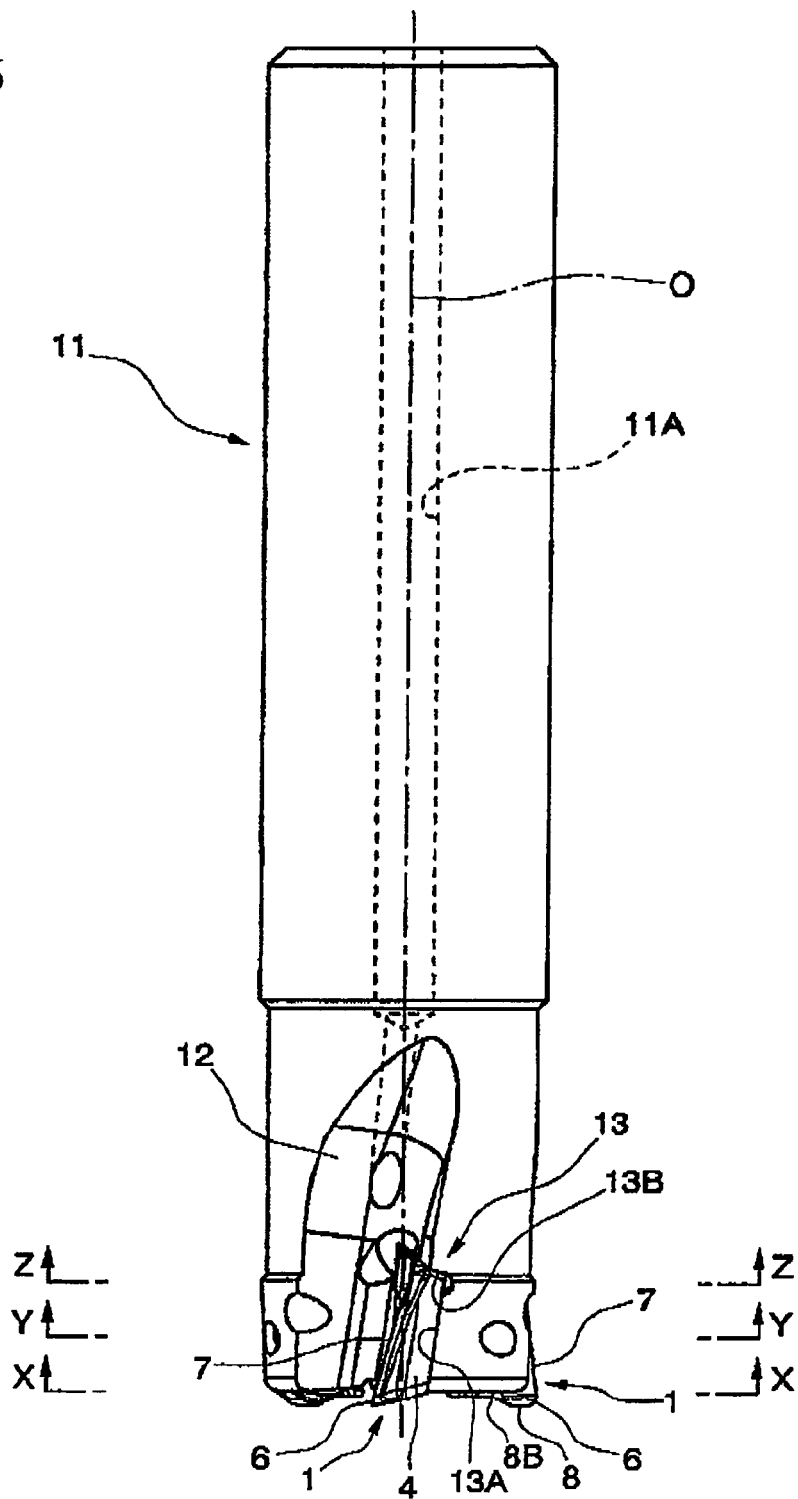
FIG. 6 is a side view of the rotary cutting tool shown in FIG. 5.
Figure 7:
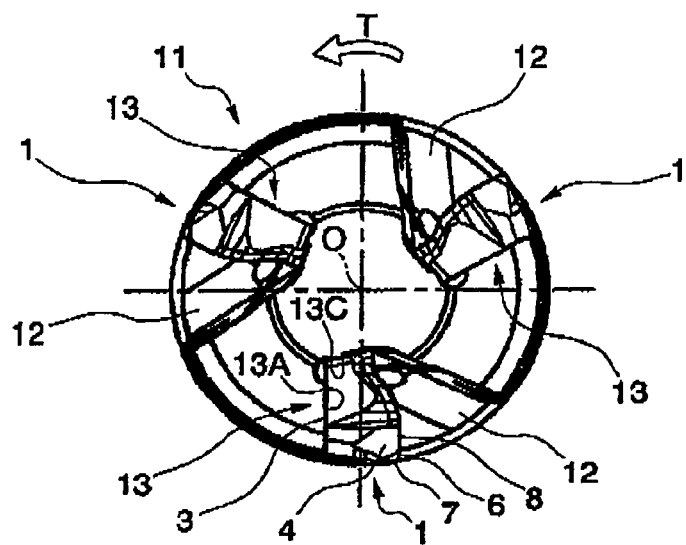
FIG. 7 is a front view of the rotary cutting tool shown in FIG. 5.

As shown in FIG. 5 to FIG. 7, the insert of the present embodiment constructed as above is releasably mounted to the tool body 11 to constitute a rotary cutting tool of the present embodiment. The tool body 11 is made of a steel material, etc., and is formed in a substantially columnar shape about an axis O. A rear end (an upper portion in FIG. 5 and FIG. 6) of the tool body 11 is gripped by a spindle, etc. of a machine tool and is rotated in the rotating direction T of the tool about the axis O to be used for cutting. It is noted herein that the periphery at a distal end of the tool body 11 is formed with insert pockets 12 which are opened at a distal face of the tool body and extends toward the rear end. Moreover, an end wall face of each of the insert pockets 12, which faces forward in the rotating direction T, is formed with a insert mounting seat 13. The insert body 1 of the insert of the above-described embodiment is mounted to this insert mounting seat 13. In addition, the insert pocket 12, as shown in FIG. 6, is formed to extend rearward in the rotating direction T while being convexly curved forward in the rotating direction T, as it approaches the rear end of the tool body 11.

The insert mounting seat 13 comprises a mounting seat bottom face 13A which has almost the same planar shape and size as that of the seat face 3 and which is inclined rearward in the rotating direction T at a recess formed to be recessed rearward in the rotating direction T from the wall face of the insert pocket 12 as it approaches the rear end of the tool forward in the rotating direction T of the tool, a insert mounting seat wall face 13B which rises from a portion of the mounting seat bottom face 13A at the rear end of the tool and which faces the distal end of the tool so as to be connected to the wall face, and a mounting seat wall face 13C which rises from a portion of the mounting seat bottom face 13A at the inner peripheral side of the tool and which faces the outer peripheral side of the tool. Further, the center of the mounting seat bottom face 13A is formed with a screw hole (not shown) having a clamping screw 14, which is inserted through the mounting hole 5 of the insert body 1, screwed thereinto. Also, the shape of the mounting seat wall faces 13B and 13C and the inclination angle thereof 13C with respect to the mounting seat bottom face 13A are respectively adjusted depending on the shape of the relief face 4 connected to the sub-cutting edge 8 of the insert body 1 and the inclination angle of the relief face 4 with respect to the seat face 3, and the shape of the constraint face 4C of the relief face 4 connected to the main cutting edge 7 and the inclination angle of the constraint face with respect to the seat face 3.

The insert body 1 is mounted to the insert mounting seat 13 by seating the seat face 3 on the mounting seat bottom face 13A with the one parallelogrammic surface having the rake face 2 formed therein facing forward in the rotating direction T of the tool, by abutting the relief face 4 connected to one sub-cutting edge 8 against the mounting seat wall face 13B, and abutting the constraint face 4C intersecting the one sub-cutting edge 8 via the corner cutting edge 6 and connected to one main cutting edge 7 against the mounting seat bottom face 13C, thereby constraining the rotation of the insert about the central axis C, and then by fixing the insert with a clamping screw 14. In addition, a corner where the mounting seat wall faces 13B and 13c intersect each other is formed with a recess for preventing the interference between the one corner cutting edge 6 where the one main cutting edge 7 and the sub-cutting edge 8 intersects each other and the relief face 4 connected thereto.

Figure 8:
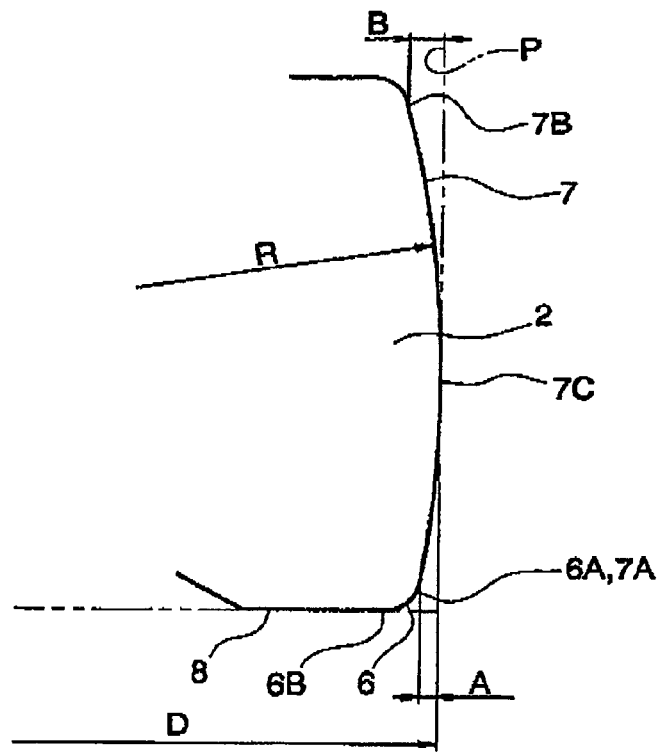
FIG. 8 is a view illustrating a projection line which is obtained by projecting a rotation locus of the main cutting edge 7 onto a plane including an axis O in a mounted state of the insert shown in FIG. 1.

Accordingly, in the insert body 1 mounted in this manner, a corner cutting edge 6 opposite to the one corner cutting edge 6 is positioned at the outer peripheral side of the distal end of the tool body 11, and the main cutting edge 7 whose one end 7A coincides with the one end 6A of the corner cutting edge 6 is mounted to extend rearward in the rotating direction T as it approaches the rear end at the outer periphery of the distal end of the tool body 11. Further, the sub-cutting edge 8 connected to the other end 6B of the corner cutting edge 6 is disposed to be positioned on a plane perpendicular to the axis O of the tool body 11, and the concave portion 8B connected to the other end 8A of the sub-cutting edge retreats with respect to the plane. Also, in a state in which the insert of the present embodiment is mounted to such a tool body 11, the main cutting edge 7 extending at the outer periphery of the distal end of the tool body 11 is formed in a convex arcuate shape such that a projection line obtained by projecting a rotation locus about the axis O of the tool body on a plane including the axis O as shown in FIG. 8 smoothly contacts a cylindrical surface P about the axis O at a middle portion 7C between the one end 7A of the main cutting edge and the other end 7B of the main cutting edge, and retreats to the inside of the cylindrical surface P as it approaches both ends of the main cutting edge, i.e., the one end 7A and other end 7B of the main cutting edge.

Specifically, the insert of the above embodiment is mounted to the insert body 1, as described above, in a state in which the main cutting edge 7 formed in a shape of a convexly curved line which protrudes outward from the rake face 2 as seen from the top of the insert body 1 is disposed to extend rearward in the rotating direction T as it approaches the rear end of the tool body 11. Thus, the main cutting edge 7 is formed in a convex arcuate shape which contacts the straight line at the middle portion 7C from the inside of the cylindrical surface P, as shown in FIG. 8, without being included in the cylindrical surface P about the axis O, that is, without causing the projection line of the main cutting edge to coincide with the straight line parallel to the axis O and defined by the cylindrical surface P as seen from the top on the plane including the axis O, unlike the cutting edge in Japanese Unexamined Patent Application Publication No. 2-298414 and the curved cutting edge in Japanese Unexamined Patent Application Publication No. 2003-334716. In addition, the radius R of a convex arc defined by the projection line of the main cutting edge 7 becomes sufficiently large, and the amount by which both ends of the projection line 7 of the main cutting edge 7 which defines the convex arc retreats inward from the cylindrical surface P is set such that a retreat amount A of the one end 7A of the main cutting edge 7 is smaller than a retreat amount B of the other end 7B of the main cutting edge 7. For example, in the present embodiment in which the width W of the rake face 2 connected to the main cutting edge 7 is set to 0.6 mm as described above, the retreat amount B is about 0.02 mm, whereas the retreat amount A is about 0.01 mm which is about half of the retreat amount A.

Moreover, in the insert of the present embodiment, the inclination angle of the rake face 2 connected to the main cutting edge 7 with respect to the seat face 3 gradually decreases as it approaches the other end 7B of the main cutting edge 7 from the one end 7A of the main cutting edge 7, as described above. However, the decreasing ratio of the inclination angle gradually decreases from the one end 7A toward the other cutting edge 7B, and then gradually increases from the middle of the main cutting edge. In this manner, the seat face 3 of the insert body 1 is seated on and mounted to the mounting seat bottom face 13A of the insert mounting seat 13 which is inclined rearward in the rotating direction T as it approaches the rear end of the tool body 11. Thus, in this mounted state, the rake angle defined by the rake face 2 gradually decreases from the one end 7A toward the other end 7B and then gradually increases. Specifically, as shown in the cross-sectional view of FIG. 9, rake angles $\alpha$, $\beta$ and $\gamma$ of the rake face 2 at the one end 7A of the main cutting edge 7, at the middle between both ends 7A and 7B thereof, and at the other end 7B thereof satisfy the following relationship: $\alpha > \beta < \gamma$. Here, since the outer diameters of the main cutting edge 7 at its one end 7A and other end 7B are respectively smaller than the outer diameter D of the main cutting edge at its middle portion 7C by twice the retreat amounts A and B because the projection line of the main cutting edge 7 is formed in shape of a convex arc as described above.

In addition, in the rotary cutting tool of the present invention, the distal end of the tool body 11 is formed with a plurality of (three in the drawings) insert pockets 12 and insert mounting seats 13 which is arranged at equal intervals in the circumferential direction and which is in a rotational symmetry about the axis O. The insert body 1 is mounted to each of the insert mounting seats 13 such that the rotation loci of the cutting edges (the corner cutting edge 6, the main cutting edge 7 and the sub-cutting edge 8) thereof coincide with each other. Further, the tool body 11 is formed with a coolant supply hole 11A along the axis O from the rear end. This coolant supply hole 11A is branched at the distal end of the tool body 11 and is opened to the inner wall face of each of the insert pockets 12 so as to face the rake face 2 of the insert body 1. The surface of the distal end of the tool body 11 including at least the inner wall face of the insert pocket 12 has a surface roughness of less than Ry 3.2 µm by a turning process, grinding and lapping, and is subjected to nickel plating, or lubricative coating using DLC, WCC, $MoS_2$, CrN, TiN, $Al_2O_3$, and the like. Further, the dimension of the outer diameter D of the cutting edge measured based on a master insert may be indicated on the outer peripheral surface or the distal end face of the tool body 11 by marking such as laser marking or punching.

In the insert and rotary cutting tool constructed as above, the main cutting edge 7 is formed in a shape of a convex arc which retreats inward from the cylindrical surface P as the projection line of the rotation locus about the axis O approaches both ends 7A and 7B, without being included on the cylindrical surface P about the axis O of the tool body 11 unlike the cutting edge in Japanese Unexamined Patent Application Publication No. 2-298414 and the curved cutting edge in Japanese Unexamined Patent Application Publication No. 2003-334716. Thus, for example, even when the insert body 1 is mounted to the tool body 11 such that the main cutting edge 7 is inclined from a predetermined position as seen from the top, the projection line, i.e., the rotation locus of the main cutting edge 7 itself does not experience a great change as long as the main cutting edge 7 extends in the direction along the convex arc defined by the projection line. Accordingly, a desired vertically machined surface can be formed. In particular, in the insert fixed to the tool body 11 by screwing the clamping screw 14 through the mounting hole 5 provided to pass though the insert body 1 in the direction of its thickness, the insert is apt to be mounted in a state inclined with respect to the center line C of the mounting hole 5 irrespective of the abutment of the mounting seat wall faces 13B and 13C. However, since the main cutting edge extends substantially in the direction along the convex arc defined by the projection line, it is possible to prevent the precision of a vertically machined surface from being remarkably deteriorated.

Figure 10:
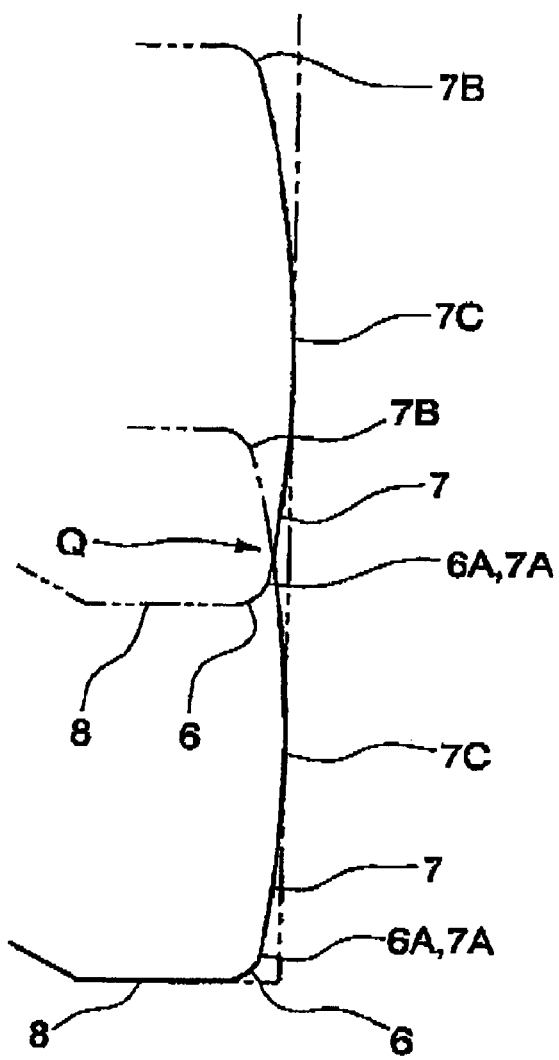
FIG. 10 is a view illustrating projection lines of the rotation locus of the main cutting edge 7 in the case of forming a vertically machined surface which is deeper than an effective cutting edge length, by using the rotary cutting tool having the insert shown in FIG. 1 mounted thereto.

Moreover, in the case of forming a vertically machined surface having a depth larger than the effective cutting edge length of the main cutting edge 7, as described above, the tool body 11 is moved step by step toward the distal end in the direction of the axis O thereof to perform cutting so as to sequentially dig down the vertically machined surface. In this case, a vertically machined surface formed by the insert and rotary cutting tool of the above construction, has a shape obtained by shifting and transferring a convex arc defined by the projection line of the main cutting edge 7 in the direction of the axis O. Accordingly, a joint Q between vertically machined surfaces at respective stages has a shape which is formed by overlapping a portion formed by the one end 7A of the main cutting edge 7 at the time of the previous cutting and which retreats inward from the cylindrical surface P, and a portion formed by the other end of the main cutting edge 7 during cutting which is performed in a state in which the tool body 11 is moved to the next stage and which similarly retreats inward from the cylindrical surface P. That is, the joint has a section of a chevron that has concave arcs as both inclined faces thereof as shown in FIG. 10. However, as described above, the radius R of an arc defined by the projection line of the main cutting edge 7 is set to be sufficiently large, thereby making the inclination of the chevron-shaped inclined faces defined by the section extremely smooth. As a result, the height of the chevron can be suppressed to approximate the flat faces extending along the cylindrical surface P to a sectional shape that the flat faces are continuously connected to each other.

For this reason, according to the above insert and rotary cutting tool, even when a deeply and vertically machined surface is formed step by step in that manner, it is possible to prevent a problems that the joint Q between the vertically machined surfaces at the respective stages becomes so large that stripes may be formed in the feed direction of the tool body 11, and it is possible to form a vertically machined surface having high surface quality with no conspicuous joint Q. Moreover, in the case of moving the tool body 11 step by step in that manner, even if the cylindrical surfaces P deviate from each other during cutting at respective stages and do not coincide with each other because of the occurrence of bending in the tool body 11 caused by load, etc. during cutting, the joint Q still has the shape that the convex arcs in section overlap each other as described above. Thus, the height of the chevron and the inclination of the inclined face are not remarkably increased. Accordingly, even if bending occurs in the tool body 11 in that way, the joint Q is prevented from being conspicuous. As a result, it is possible to form a vertically machined surface with high surface quality and high precision.

Furthermore, in the insert and rotary cutting tool of the present embodiment, the distance A by which the one end 7A, which is disposed at the distal end of the outer periphery of the tool body 11 retreats from the cylindrical surface P, of both ends 7A and 7B of the main cutting edge 7 which retreats inward from the cylindrical surface P in the projection line of the main cutting edge 7, is set to be smaller than the distance B by which the other end 7B disposed at the rear end 7B of the outer periphery of the tool body 11 retreats from the cylindrical surface P. However, in the case of forming a bottom face orthogonal to the vertically machined surface, as shown in FIG. 10, at the bottom (at the distal end of the tool body 11) of the vertically machined surface which has been cut as described above, using the sub-cutting edge 8 connected to the main cutting edge 7 via the corner cutting edge 6, if the corner cutting edge 6 and the one end 7A of the main cutting edge 7 connected to the sub-cutting edge 8 retreats inward from the cylindrical surface P as described above, it is not possible to prevent a corner where the vertically machined surface and the bottom face intersects each other from being inclined inward from the cylindrical surface P. However, since the retreat amount A of the main cutting edge 7 at the one end 7A becomes small as described above, it is possible to suppress the size and inclination of the corner which retreats inward from the cylindrical surface P, thereby approximating the vertically machined surface and the bottom face to a state in which they intersect each other at right angle. For this reason, according to the present embodiment, even if a bottom face is formed at the bottom of the vertically machined surface in this manner, it is possible to obtain a machined surface with higher quality.

On the other hand, as seen from the side facing the relief face 4, the main cutting edge 7 of the insert is formed in shape of a convexly curved line which extends toward the seat face 3 while being convexly curved as it approaches the other end 7B of the main cutting edge 7 from the one end 7A thereof. The mounting seat bottom face 13A of the insert mounting seat 13 having the seat face 3 seated thereon is inclined as described above. As a result, such a main cutting edge 7 is mounted so as to extend rearward in the rotating direction T of the tool body 11 as it approaches the rear end of the tool body 11. For this reason, at the time of deep cutting which utilizes almost the entire effective cutting edge length, the axial rake angle is can be increased at the other end 7b of the main cutting edge 7 at the rear end of the tool. Thus, even if wide chips are produced at the time of such deep cutting, it is possible to dispose the chips by rapidly separating them from the rake face 2.

Also, as the main cutting edge 7 is formed in a shape of a convexly curved line as seen from the side, the rake face 2 connected to the main cutting edge 7 is also formed in a shape of a convexly curved face which is convexly curved forward in the rotating direction T, similarly. In contrast, in the insert and rotary cutting tool of the above construction, not only the main cutting edge 7 is formed in shape of a convexly curved line as seen from the top, but also the projection line of the main cutting edge is formed in a shape of an arc which defines a convexly curved line. Thus, chips produced by such a main cutting edge 7 has a recessed sectional shape which is largely curved such that the middle portion 7C is recessed with respect to both ends 7A and 7B of the main cutting edge 7. Specifically, according to the insert and rotary cutting tool, the most recessed portions of chips which are largely bent in a recessed shape flow out onto the rake face 2 along the most protruding portion of the convex rake face 2. Thus, chips can be more easily separately from the rake face 2. Accordingly, as described above, not only the axial rake angle can be made larger at the other end 7B, but also chip clogging and biting can be surely prevented from occurring even during deep cutting or high-speed cutting. As a result, it is possible to further improve the cutting efficiency.

Moreover, the rake face 2 connected to the main cutting edge 7 is formed in shape of an inclined face which is inclined not only to the inside thereof but also to the seat face 3. As a result, the radial rake angle of the rake face 2 can be set to be a positive angle. Thus, even during the above-mentioned deep cutting or high-speed cutting, it is possible to reduce the cutting resistance, and it is possible to prevent the tool body 11 from being bent or chattered due to such cutting resistance. Furthermore, since the width W of the rake face 2 is set to a small width as described above in the present embodiment, it is possible to further reduce the cutting resistance. Further, the inclination angle at which the rake face 2 formed in a shape of an inclined face is defined toward the inside thereof gradually decreases from the one end 7A of the main cutting edge 7 toward the other end 7B of the main cutting edge for the seat face 3. Accordingly, the rake angle (radial rake angle) is prevented from being remarkably different at the one end 7A of the main cutting edge 7 at the distal end of the tool and the other end 7B thereof at the rear end of the tool. Thus, it is possible to promote smooth cutting by virtue of stable creation of chips.

Figure 9A:
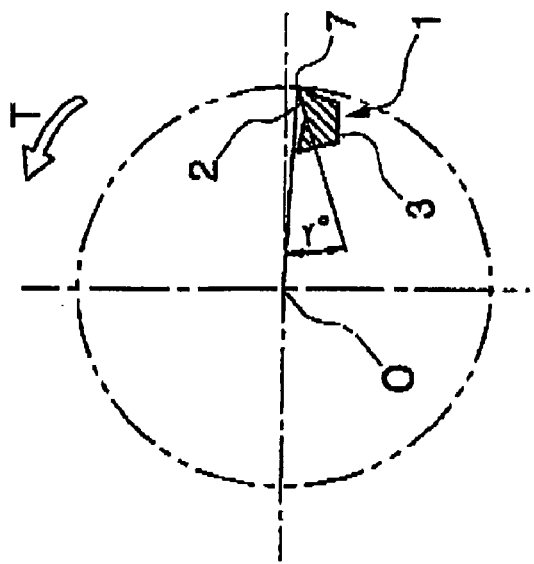
FIGS. 9A–9C are cross-sectional views of a insert body 1 taken along the lines X—X, Y—Y and Z—Z in FIG. 6.
Figure 9B:
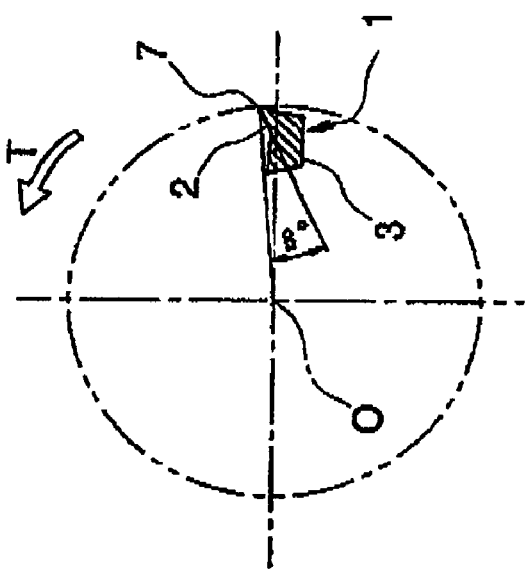
Figure 9C:
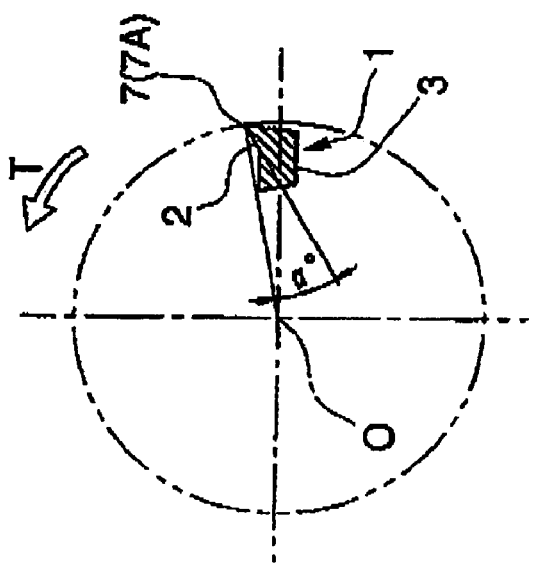

On the other hand, in a state in which the insert body 1 is attached to the tool body 11, the inclination angle of the rake face 2 varies from one end 7A toward the other end 7B, as shown in FIG. 9. That is, the inclination angle gradually decreases from the rake angle α to the rake angle β, and then gradually increases from the rake angle β to the rake angle γ at the other end 7B. Accordingly, while stably creating chips as described above, inside the rake face 2, the rake face 2 which is convexly curved as described above can be made largely protruded at a portion inside thereof between both ends 7A and 7B of the main cutting edge 7 than a portion thereof inside both ends 7A and 7B of the main cutting edge 7. For this reason, chips which are produced in a recessed shape by the main cutting edge 7 whose projection line is formed in a shape of a convex arc flow on the rake face 2 which is more largely convexly curved inward. Thus, it is possible to further improve chip separation. Even when a metallic material, such as aluminum, having high ductility is cut at high speed, it is possible to obtain an excellent chip disposal property. In addition, if the position where the rake angle becomes the smallest coincides with the middle portion 7C where the main cutting edge 7 contacts the cylindrical surface P of the projection line, it is more effective to dispose chips.

Figure 11:
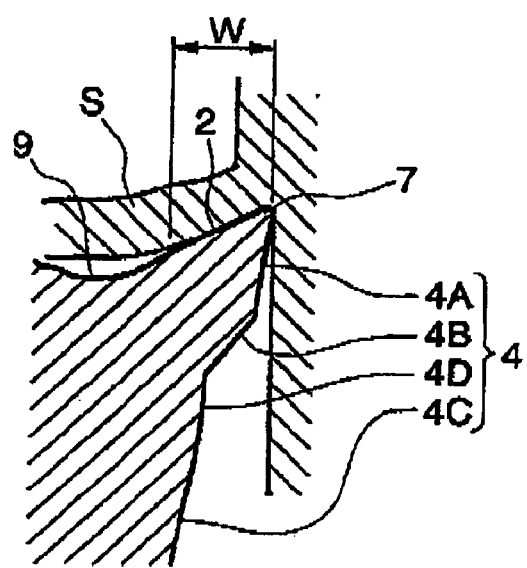
FIG. 11 is an enlarged cross-sectional view similar to the cross-sectional views taken along the line Z—Z in FIGS. 1 and 2, illustrating a chip S which is produced by the insert shown in FIG. 1.

In addition to the above, in the present embodiment, the recessed face 9 with a sectional shape of a concave arc which is recessed from the inclined face defined by the rake face 2 toward the seat face 3 is formed over the entire periphery of the rake face 2 further inside the rake face 2. The recessed face 9 is formed to extend along the main cutting edge 7 with an almost equal spacing from the main cutting edge 7 as seen from the top inside the main cutting edge 7. Accordingly, as shown in FIG. 11, a chip S which has flown out of the rake face 2 is forcefully separated from the rake face 2 when it reaches the recessed face 9. Thus, it is possible to improve more reliable chip separation. In particular, in the present embodiment, such recessed face 9 is formed over the entire periphery of the one parallelogrammic surface inside the rake face 2. Accordingly, it is also possible to promote excellent chip separation for chips produced by the corner cutting edge 6 and the sub-cutting edge 8.

On the other hand, in the present embodiment, the relief face 4 connected to the main cutting edge 7 is formed with the first relief face 4A which is connected to the main cutting edge 7 and which is inclined to gradually retreat at a small inclination angle as it approaches the seat face 3, and the second relief face 4B which is connected to a portion of the first relief face 4A at the seat face 3 and which is inclined to gradually retreat at a larger inclination angle than the first relief face 4A. Accordingly, it is possible to secure a cutting edge point angle at an edge point of the main cutting edge 7 by the first relief face 4A which has a smaller rake angle as its inclination become small. In particular, as in the present embodiment, when the rake face 2 is formed in a shape of an inclined face which is inclined to the seat face 3 as it approaches the inside thereof, the cutting edge point can be prevented from chipping. In contrast, it is possible to secure a sufficient relief distance at the side away from the cutting edge point by the second relief face 4B which is largely inclined. Thus, the cutting resistance can be prevented from increasing due to twice colliding with the vertically machined surface. Moreover, these first and second relief faces 4A and 4B is formed to extends toward the seat face 3 while being convexly curved as it approaches the other end 7B of the main cutting edge 7 from the one end 7A of the main cutting edge 7 as seen from the side, similarly to the main cutting edge 7. As shown in FIG. 2, the widths of the first and second relief faces 4A and 4B from the main cutting edge 7 can be made uniform over the entire length of the main cutting edge 7. For example, it is possible to prevent a situation that the first relief face 4A is partially widened to cause the above-mentioned twice colliding, or the first relief face 4A is partially narrowed to easily cause chipping.

Further, when such insert body 1 is made of cemented carbide, etc. as described above, the relief face 4 is formed by forming an inner peripheral surface of a cavity formed at a die of a pressing die into a shape conformed to the relief face 4, and by sintering a powder compact obtained by compressing a source powder such as cemented carbide which is filled into the cavity. In this case, as in the present embodiment, when the relief face 4 has the first and second relief faces 4A and 4B, and the stepped portion is formed on a portion of the relief face 4 on the main cutting edge 7 so as to protrude toward the outer peripheral side, at the time of compression of the source powder, the source powder is more densely compressed between a portion of the inner peripheral surface of the cavity which forms the stepped portion and corresponds to the second relief face 4B and a punch surface of an upper punch corresponding to the rake face 2. Accordingly, deformation due to sintering is suppressed at the stepped portion around the main cutting edge 7 which is densely compressed in that manner, which makes it possible to obtain a insert body 1 which has a desired dimension and shape of the main cutting edge 7. Thus, according to the present embodiment, in particular, it is possible to provide a insert whose main cutting edge 7 has high precision, and it is possible to more reliably exhibit the above-mentioned effects by virtue of the main cutting edge 7.

Moreover, in the present embodiment, the third relief face 4D which is connected to the second relief face 4B inclined at a large inclination angle (relief angle) and which extends perpendicularly to the seat face 3 is formed at the seat face 3 of the first and second relief faces 4A and 4B, which is formed into a stepped portion at the one end 7A of the main cutting edge 7. Also, the constraint face 4C is formed between the third relief face 4D and the seat face 3 to be inclined so as to retreat toward the inside of the insert body 1 as it approaches the seat face 3. Thus, for example, compared to the case in which the constraint face 4C is directly connected to the second relief face 4B like the other end 7B of the main cutting edge 7, it is possible to secure a large thickness of the insert body 1 right below the stepped portion which is formed by the first and second relief faces 4A and 4B. However, in a state in which the insert body 1 is mounted to the tool body 11, the surroundings of the one end 7A of the main cutting edge 7 and the corner cutting edge 6 connected thereto are positioned forward in the rotating direction T of the tool to bite into a workpiece for the first time. For this reason, during this biting, an impact load may be applied, which tends to cause chipping or loss. However, according to the present embodiment, the thickness of the insert body 1 is secured at such a portion, so that it is possible to obtain strength enough to resist such an impact load. As a result, it is possible to extend the lifetime of a insert. In addition, the relief face 4 is formed to have an inclined face in which the first and second relief faces 4A and 4B and the constraint face 4C retreat toward the inside of the insert body 1 as it approaches the seat face 3, and the third relief face 4D is formed perpendicularly to the seat face 3. Thus, as described above, the entire periphery of the insert body 1 is formed into a shape which is not inclined or protruded toward the outside of the insert body 1 between the cutting edges 6 to 8 to the seat face 3, that is, a profile which does not have a so-called undercut portion. Thus, even when a powder compact is press-formed to manufacture a insert by the pressing die, it is advantageous in performing press-forming by a reliable and relatively simple metal die.

Furthermore, in the insert of the present embodiment, the sub-cutting edge 8 is formed at the side ridge of the rake face 2 connected to the other end 6B of the corner cutting edge 6, and the sub-cutting edge 8 is positioned on the plane perpendicular to the axis O when the insert is mounted on the tool body 11. Thus, it is possible to more reliably approximate the vertically machined surface formed in the workpiece and the bottom face of the insert to a state in which they intersect each other at right angle. Also, the concave portion 8B which is recessed to the inside of the rake face 2 with respect to the extension line L of the sub-cutting edge 8 is formed at the other end 8A of the sub-cutting edge 8 which is located at the inner periphery of the tool body 11. Accordingly, the concave portion 8B is also recessed so as to retreat from the plane perpendicular to the axis O. Thus, even in the case of performing a rubbing process in which a groove or recess having an inclined bottom face is formed in a workpiece by feeding the tool body 11 toward the distal end obliquely toward the axis O, it is possible to prevent the inner peripheral portion of the tool body 11 rather than the other end 8A from interfering with the bottom face formed by the sub-cutting edge 8.

Furthermore, in the insert of the present embodiment, in plan view as seen from the side facing the rake face 2 in the direction of the center line C of the insert body 1, the angle $\theta$ formed between a tangential line M which touches the concave portion 8B and the extension line L is set to be larger than in a range of 5° to 20° than an angle $\delta$ formed between the side ridge 3A of the seat face 3 located on the opposite side to the side ridge having the concave portion 8B formed therein, and the tangential line L. Thus, even if the inclined angle of the bottom face becomes large during the rubbing process, the concave portion 8B or the side portion of the insert body 1 connected to the concave portion can be more reliably prevented from interfering with the bottom face. As a result, it is possible to perform a cutting process with a high degree of freedom on a workpiece. In other words, there is a fear that, if the difference between the angles $\theta$ and $\delta$ is below 5°, the retreat amount of the concave portion 8B with respect to the extension line L of the sub-cutting edge 8 is insufficient, while if the difference between the angles $\theta$ and $\delta$ exceeds 20°, the relief angle of the side, particularly, the obtuse end corner 2A of the insert body 1 connected to the concave portion 8B is not sufficient. In each case, there is a fear that, when the feed amount of the tool body 11 in the direction of the axis O to the feed amount of the tool body 11 in the direction orthogonal to the direction of the axis O during the rubbing process is made large, that is, when the inclined angle of the bottom face is made large, the insert body 1 may interfere with the formed bottom face to damage the bottom face, or an increase in resistance or damage to the insert body 1 may be caused.

Still further, in the present embodiment, the angle $\theta$ of the tangential line M of the concave portion 8B formed with respect to the extension line L of the sub-cutting edge 8 is made larger than the angle $\delta$ of the side ridge 3A of the seat face 3 with respect to the tangential line M. Thereby, the relief angle of the side of the insert body 1 having the sub-cutting edge 8 or concave portion 8B formed therein, as described above, gradually increases from the obtuse end corner 2A toward the other end 8A of the sub-cutting edge 8 along the concave portion 8B and then becomes maximum at the relief face 4 connected to the sub-cutting edge 8. Thus, even when the inclination angle is made large during the rubbing process, the relief face 4 connected to the sub-cutting edge 8 can also be prevented from interfering with the bottom face. Additionally, in the present embodiment, since the concave portion 8B is recessed to define a concave arc as seen from the top, it is possible to secure the strength of the insert body 1 at the other end 8A connected to the sub-cutting edge 8, and it is advantageous in that chipping in the portion can also be prevented.

In addition, in the present invention, the insert body 1 is formed in a shape of a flat plate shape which defines a substantially parallelogrammic surface as seen from the top. However, the insert body may is formed in other shapes as long as a surface having the rake face formed therein is a polygonal surface which has at least a corner formed with a corner cutting edge and a ridge connected to the corner and formed with a main cutting edge. Further, even if the first and second relief faces 4A and 4B are formed to retreat toward the inside of the insert body 1 as it approaches the seat face 3, they may be formed into a convexly curved surface which retreats toward the seat face 3 while being convexly curved toward the outside of the insert body 1 in a cross-section orthogonal to the main cutting edge 7. Moreover, in the rotary cutting tool of the present embodiment, the insert pocket 12 which is formed at the outer periphery of the distal end of the tool body 11 is curved rearward in the rotating direction T as it approaches the rear end of the tool body 11 while being convexly curved in the rotating direction T, similarly to the profile of the main cutting edge 7 of the insert in its mounted state. Thus, it is possible to discharge well separable chips produced by the main cutting edge 7 more effectively and rapidly toward the rear end of the tool body 11. Also, even when a vertically machined surface having a width of more than an effective cutting edge length is cut, or when grooving is performed using the rotary cutting tool, it is possible to prevent the occurrence of biting due to stay of chips.

What is claimed is:

1. A throwaway insert comprising:
    a insert body which defines a substantially polygonal flat plate shape;
    a rake face formed on one polygonal surface of the insert body;
    a corner cutting edge formed at a corner of the rake face and having a substantial arcuate shape from a top view facing the one polygonal surface of the insert body;
    a main cutting edge formed at a side ridge of the rake face connected to one end of the corner cutting edge; and
    a relief face constituted by a side face of the insert body, wherein
    the throwaway insert is to mount on a tool body which is rotated about an axis such that the rake face faces forward in a rotating direction of a tool, the corner cutting edge is positioned at an outer periphery of a distal end of the tool body, and the main cutting edge extends rearward in the rotating direction of the tool body as the main cutting edge approaches the rear end of the tool body at the outer periphery of the tool body,
    the rake face connected to the main cutting edge comprises: an inclined face which is inclined inward toward the other polygonal surface of the insert body serving as a seat face to seat on the tool body,
    an inclination angle of the rake face with respect to the seat face gradually decreases from one end of the main cutting edge connected to the one end of the corner cutting edge toward the other end thereof, and a rake angle which is formed by the rake face with the insert mounted to the tool body gradually decreases and then gradually increases from one end of the main cutting edge toward the other end thereof,
    the main cutting edge is formed in a shape of a convexly curved line which protrudes toward the outside of the rake face from a top view and a shape of another convexly curved line which extends toward the seat face and convexly curved from the one end of the main cutting edge to the other end thereof from a side view facing the relief face, and
    when the insert is mounted on the tool body, a projection line of a rotation locus of the main cutting edge about the axis forms a shape of a convex arc which smoothly comes, at a middle portion of the main cutting edge, into contact with a cylindrical surface having its center line corresponding to the axis and which gradually retreats inward from the cylindrical surface as it approaches both ends of the main cutting edge.

2. The throwaway insert according to claim 1, wherein the one end of the main cutting edge is retreated less than the other end of the main cutting edge, which is positioned at the outer periphery of the rear end of the tool body.

3. The throwaway insert according to claim 1, wherein a recessed face, which is recessed from the inclined face toward the seat face and has a concave cross-sectional shape, is formed inward of the rake face comprising the inclined face, to extend around an entire outer periphery of the rake face, and the recessed face is separated by substantially the same interval from the main cutting edge.

4. The throwaway insert according to claim 1, wherein the relief face connected to the main cutting edge comprises:
    a first relief face connected to the main cutting edge and inclined to gradually retreat toward the seat face; and
    a second relief face connected to a portion of the first relief face at the seat face and inclined to gradually retreat at a larger inclination angle than the first relief face,
    wherein the first and second relief faces are formed such that they extend toward the seat face while being convexly curved from the one end of the main cutting edge toward the other end thereof.

5. The throwaway insert according to claim 4, wherein at least the one end of the main cutting edge is formed with a planar third relief face which is connected to a portion of the second relief face at the seat face and extends perpendicularly to the seat face.

6. The throwaway insert according to claim 1, wherein a side ridge of the rake face connected to the other end of the corner cutting edge is formed with a sub-cutting edge extending from the other end of the corner cutting edge toward the inner periphery of the tool body with the insert mounted to the tool body, and a concave portion, which is connected to the sub-cutting edge, reaches the other corner of the rake face opposite to the corner having the corner cutting edge formed therein and recesses inside the rake face with respect to the extension line of the sub-cutting edge, and
    wherein an angle of a tangential line touching both ends of the concave portion formed with respect to the extension line of the corner cutting edge is in a range of 5° to 20° and larger than an angle at which a side ridge of the other polygonal surface located on the opposite side to the side ridge having the sub-cutting edge and the concave portion formed therein is formed with respect to the extension line.

7. A throwaway type rotary cutting tool, comprising:
a tool body; and
a throwaway insert according to claim 1, the throwaway insert being mounted on the tool body rotated about an axis such that the rake face faces forward in a rotating direction of the tool,
wherein the corner cutting edge is positioned at an outer periphery of a distal end of the tool body, and the main cutting edge extends rearward in the rotating direction of the tool body as the main cutting edge approaches the rear end at the outer periphery of the tool body.

* * * * *